US012603366B2

(12) United States Patent     (10) Patent No.:    US 12,603,366 B2

Lim et al.              (45) Date of Patent:     Apr. 14, 2026

(54) BATTERY CELL AND BATTERY MODULE INCLUDING THE SAME

(71) Applicant: LG Energy Solution, Ltd., Seoul (KR)

(72) Inventors: Hun-Hee Lim, Daejeon (KR);
Sang-Hun Kim, Daejeon (KR);
Hyung-Kyun Yu, Daejeon (KR);
Min-Hyeong Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 702 days.

(21) Appl. No.: 17/802,425

(22) PCT Filed: Nov. 2, 2021

(86) PCT No.: PCT/KR2021/015737
§ 371 (c)(1),
(2) Date: Aug. 25, 2022

(87) PCT Pub. No.: WO2022/098063

PCT Pub. Date: May 12, 2022

(65) Prior Publication Data

US 2023/0084670 A1     Mar. 16, 2023

(30) Foreign Application Priority Data

Nov. 6, 2020    (KR) ........................ 10-2020-0147669
Oct. 25, 2021    (KR) ........................ 10-2021-0142441

(51) Int. Cl.
*H01M 50/172*      (2021.01)
*H01M 50/124*      (2021.01)
(Continued)

(52) U.S. Cl.
CPC ..... *H01M 50/172* (2021.01); *H01M 50/1243* (2021.01); *H01M 50/184* (2021.01); *H01M 50/30* (2021.01)

(58) Field of Classification Search
CPC ............. H01M 50/178; H01M 50/105; H01M 50/124; H01M 50/129; H01M 50/3425;
(Continued)

(56) References Cited

U.S. PATENT DOCUMENTS 4,532,193 A  *   7/1985   Kniazzeh ............ H01M 50/394
                                   156/324
5,707,757 A  *   1/1998   Lee ........................ H01M 50/30
                                     429/97
(Continued)

FOREIGN PATENT DOCUMENTS

CN       105684183 A     6/2016
CN       107925033 A     4/2018
(Continued)

OTHER PUBLICATIONS

International Search Report for PCT/KR2021/015737 dated Feb. 9, 2022. 2 pgs.

*Primary Examiner* — Matthew T Martin
*Assistant Examiner* — Jessie Walls-Murray
(74) *Attorney, Agent, or Firm* — Lerner David LLP

(57) ABSTRACT

Disclosed is a battery cell, which includes a battery case having an accommodation portion in which a battery assembly is positioned, and a sealing portion formed by sealing an outer periphery thereof by heat fusion; an electrode lead electrically connected to an electrode tab included in the battery assembly, the electrode lead protruding out of the battery case through the sealing portion; and a lead film positioned adjacent to the sealing portion on at least one of a first side and a second side of the electrode lead, wherein the lead film includes a gas discharge portion formed to extend from an inside of the battery case to an outside of the battery case, and the gas discharge portion is opened on a side disposed inside of the battery case.

15 Claims, 5 Drawing Sheets

(51) Int. Cl.
    *H01M 50/184*     (2021.01)
    *H01M 50/30*     (2021.01)

(58) Field of Classification Search
    CPC ............. H01M 50/342; H01M 50/394; H01M
        50/317; H01M 50/375; H01M 50/186;
        H01M 50/184; H01M 50/193; H01M
        50/198
    See application file for complete search history.

(56)         References Cited

U.S. PATENT DOCUMENTS

| | | | |
|---|---|---|---|
| 2003/0148173 A1* | 8/2003 | Gu | H01M 50/193 |
| | | | 429/185 |
| 2006/0238162 A1 | 10/2006 | Cheon et al. | |
| 2013/0011722 A1* | 1/2013 | Ahn | H01M 50/30 |
| | | | 429/179 |
| 2014/0011060 A1* | 1/2014 | Yang | H01M 50/55 |
| | | | 29/623.2 |
| 2014/0120387 A1* | 5/2014 | Kinuta | H01M 50/178 |
| | | | 429/54 |
| 2014/0199581 A1 | 7/2014 | Ryu et al. | |
| 2015/0072185 A1 | 3/2015 | Cho et al. | |
| 2015/0147605 A1* | 5/2015 | Kim | H01M 50/394 |
| | | | 429/53 |
| 2016/0315301 A1 | 10/2016 | Kim et al. | |
| 2017/0149029 A1* | 5/2017 | Chang | H01M 50/553 |
| 2018/0053976 A1* | 2/2018 | Park | H01M 4/13 |
| 2018/0114955 A1* | 4/2018 | Robert | H01M 50/124 |
| 2018/0114964 A1† | 4/2018 | Kim | |
| 2020/0321577 A1 | 10/2020 | Kim et al. | |
| 2022/0223973 A1* | 7/2022 | Song | H01M 50/531 |

FOREIGN PATENT DOCUMENTS

| | | | | |
|---|---|---|---|---|
| CN | 107968167 A | | 4/2018 | |
| JP | 2001093489 A | † | 4/2001 | |
| JP | 2006086049 A | | 3/2006 | |
| JP | 2015511060 A | | 4/2015 | |
| JP | 2018525804 A | | 9/2018 | |
| KR | 100684724 B1 | | 2/2007 | |
| KR | 20090095334 A | | 9/2009 | |
| KR | 20140049748 A | | 4/2014 | |
| KR | 20140087773 A | | 7/2014 | |
| KR | 20140129600 A | | 11/2014 | |
| KR | 20160126157 A | | 11/2016 | |
| KR | 20170027150 A | | 3/2017 | |
| KR | 20170096852 A | | 8/2017 | |
| KR | 20180023817 A | | 3/2018 | |
| KR | 20190123059 A | | 10/2019 | |

* cited by examiner
† cited by third party (a)                                                (b)

BATTERY CELL AND BATTERY MODULE INCLUDING THE SAME

CROSS-REFERENCE TO RELATED APPLICATIONS

The present application is a national phase entry under 35 U.S.C. § 371 of International Application No. PCT/KR2021/015737, filed on Nov. 2, 2021, which claims priority to Korean Patent Application No. 10-2020-0147669 filed on Nov. 6, 2020 and Korean Patent Application No. 10-2021-0142441 filed on Oct. 25, 2021 in the Republic of Korea, the disclosures of which are incorporated herein by reference.

TECHNICAL FIELD

The present disclosure relates to a battery cell and a battery module including the same, and more particularly, to a battery cell with improved external emission of gas generated inside the battery cell, and a battery module including the same.

BACKGROUND ART

As technology development and demand for mobile devices increase, the demand for secondary batteries as an energy source is rapidly increasing. In particular, secondary batteries are of great interest as energy sources not only for mobile devices such as mobile phones, digital cameras, notebooks and wearable devices, but also for power devices such as electric bicycles, electric vehicles and hybrid electric vehicles.

Depending on the shape of a battery case, these secondary batteries are classified into a cylindrical battery and/or a prismatic battery in which a battery assembly is included in a cylindrical or prismatic metal can, and a pouch-type battery in which the battery assembly is included in a pouch-type case of an aluminum laminate sheet. Here, the battery assembly included in the battery case is a power element including a positive electrode, a negative electrode, and a separator interposed between the positive electrode and the negative electrode, and capable of charging and discharging, and is classified into a jelly-roll type in which long sheet-type positive and negative electrodes coated with an active material are wound with a separator being interposed therebetween, and a stack type in which a plurality of positive and negative electrodes are sequentially stacked with a separator being interposed therebetween.

Among them, in particular, a pouch-type battery in which a stack-type or stack/folding-type battery assembly is included in a pouch-type battery case made of an aluminum laminate sheet is being used more and more due to low manufacturing cost, small weight, and easy deformation.

FIG. 1 is a top view showing a conventional battery cell. FIG. 2 is a cross-sectional view, taken along the axis a-a' of FIG. 1. Referring to FIGS. 1 and 2, a conventional battery cell 10 includes a battery case 20 having an accommodation portion 21 in which a battery assembly 11 is mounted, and a sealing portion 25 formed by sealing an outer periphery thereof by heat fusion. Here, the battery cell 10 includes an electrode lead 30 protruding out of the battery case 20 via the sealing portion 25, and a lead film 40 is positioned between upper and lower portions of the electrode lead 30 and the sealing portion 25.

However, as the energy density of the battery cell increases in recent years, there is a problem that the amount of gas generated inside the battery cell also increases. In the case of the conventional battery cell 10, a component capable of discharging the gas generated inside the battery cell is not included, so a venting may occur in the battery cell due to gas generation. In addition, moisture may penetrate into the battery cell through the venting, which may cause side reactions, and there is a problem that battery performance deteriorates and additional gas is generated. Accordingly, there is an increasing need to develop a battery cell with improved external emission of gas generated inside the battery cell.

DISCLOSURE

Technical Problem

The present disclosure is designed to solve the problems of the related art, and therefore the present disclosure is directed to providing a battery cell with improved external emission of gas generated inside the battery cell, and a battery module including the same.

The object to be solved by the present disclosure is not limited to the above-mentioned object, and the objects not mentioned here may be clearly understood by those skilled in the art from this specification and the accompanying drawings.

Technical Solution

In one aspect of the present disclosure, there is provided a battery cell, comprising: a battery case having an accommodation portion in which a battery assembly is mounted, and a sealing portion formed by sealing an outer periphery thereof by heat fusion; an electrode lead electrically connected to an electrode tab included in the battery assembly and protruding out of the battery case via the sealing portion; and a lead film positioned at a portion corresponding to the sealing portion in at least one of an upper portion and a lower portion of the electrode lead, wherein the lead film includes a gas discharge portion formed to extend from the inside of the battery case to the outside of the battery case, and the gas discharge portion is opened toward the inside of the battery case.

A front surface and both side surfaces of the gas discharge portion based on a protruding direction of the electrode lead may be closed.

The battery cell may further comprise an inner layer configured to cover at least a part of a surface of the gas discharge portion.

A material of the inner layer may have a higher melting point compared to a material of the lead film and may not react with an electrolytic solution.

The lead film may comprise a polyolefin-based material, and the inner layer may contain at least one of polyolefin-based, fluorine-based and porous ceramic-based materials.

The lead film may have a greater width than the electrode lead.

The lead film may have a greater length than the sealing portion and have a smaller length than the electrode lead.

The gas discharge portion may have a greater width than the electrode lead.

The lead film may include a first lead film and a second lead film, the first lead film may be positioned at an upper portion of the electrode lead, and the second lead film may be positioned at a lower portion of the electrode lead.

The electrode lead may be positioned between the first lead film and the second lead film, and the first lead film and the second lead film may be connected to each other.

An end of the gas discharge portion formed within the lead film may be positioned outer than an outer surface of the battery case.

An end of the gas discharge portion opened toward the inside of the battery case may be positioned inner than an inner surface of the battery case.

In another aspect of the present disclosure, there is also provided a battery module, comprising the battery cell described above.

Advantageous Effects

According to the embodiments, since the present disclosure provides a battery cell including an electrode lead to which a lead film having a maximum penetration area is attached, and a battery module including the same, it is possible to improve the external emission of gas generated inside the battery cell.

The effect of the present disclosure is not limited to the above effects, and the effects not mentioned here will be clearly understood by those skilled in the art from this specification and the accompanying drawings.

BEST MODE

Figure 1:
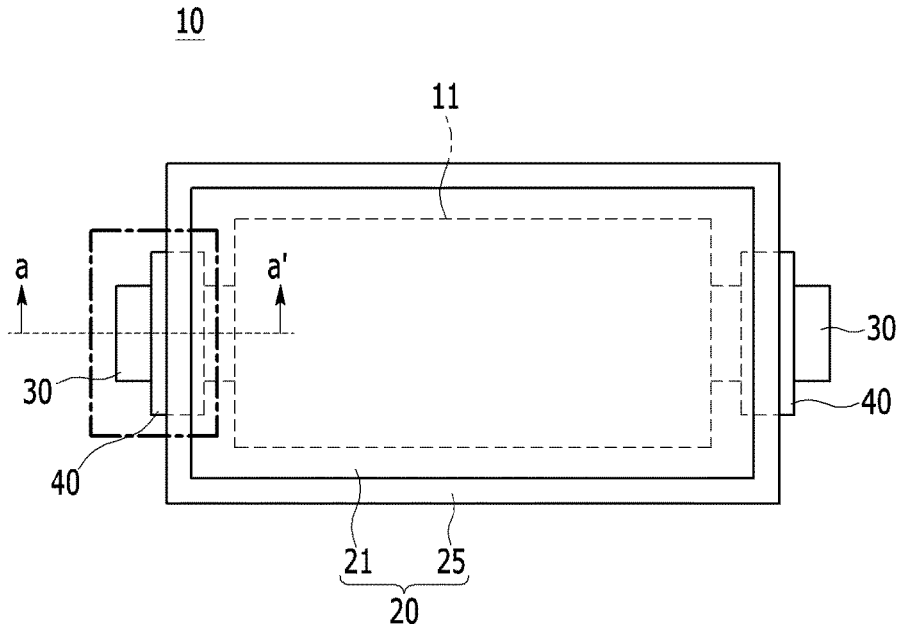
FIG. 1 is a top view showing a conventional battery cell.

Hereinafter, with reference to the accompanying drawings, various embodiments of the present disclosure will be described in detail so as to be easily implemented by those skilled in the art. The present disclosure may be implemented in various different forms and is not limited to the embodiments described herein.

In order to clearly explain the present disclosure, parts irrelevant to the description are omitted, and identical or similar components are endowed with the same reference signs throughout the specification.

In addition, since the size and thickness of each component shown in the drawings are arbitrarily expressed for convenience of description, the present disclosure is not necessarily limited to the drawings. In order to clearly express various layers and regions in the drawings, the thicknesses are enlarged. Also, in the drawings, for convenience of explanation, the thickness of some layers and regions is exaggerated.

In addition, throughout the specification, when a part "includes" a certain component, it means that other components may be further included, rather than excluding other components, unless otherwise stated.

In addition, throughout the specification, when referring to "top view", it means that the target part is viewed from above, and when referring to "cross-sectional view", it means that a vertically-cut section of the target part is viewed from a side.

Hereinafter, a pouch battery cell 100 according to an embodiment of the present disclosure will be described. However, here, the description will be made based on one side surface of the two side surfaces of the pouch battery cell 100, but it is not necessarily limited thereto, and the same or similar contents may be described in the case of the other side surface.

Figure 3:
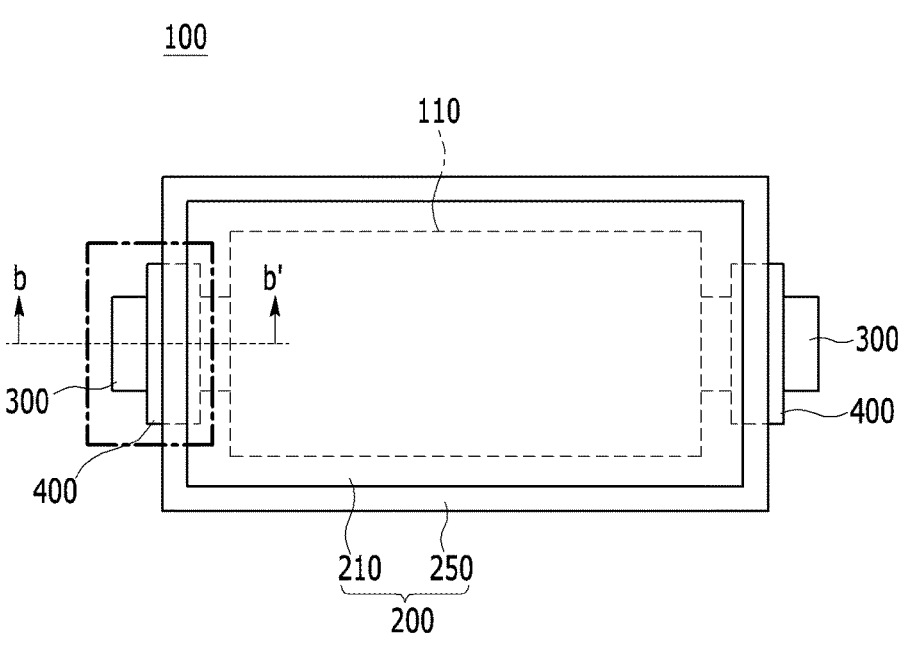
FIG. 3 is a top view showing a battery cell according to this embodiment.

FIG. 3 is a top view showing a battery cell according to this embodiment.

Referring to FIG. 3, the battery cell 100 according to this embodiment includes a battery case 200, an electrode lead 300, and a lead film 400.

The battery case 200 includes an accommodation portion 210 in which a battery assembly 110 is mounted, and a sealing portion 250 formed by sealing an outer periphery thereof by heat fusion. The battery case 200 may be a laminate sheet including a resin layer and a metal layer. More specifically, the battery case 200 may be made of a laminate sheet, and may include an outer resin layer forming the outermost layer, a barrier metal layer preventing penetration of materials, and an inner resin layer for sealing.

Also, the battery assembly 110 may have a structure of a jelly-roll type (winding type), a stack type (lamination type), or a composite type (stack/folding type). More specifically, the battery assembly 110 may include a positive electrode, a negative electrode, and a separator disposed therebetween.

Hereinafter, the electrode lead 300 and the lead film 400 will be mainly described.

Figure 4:
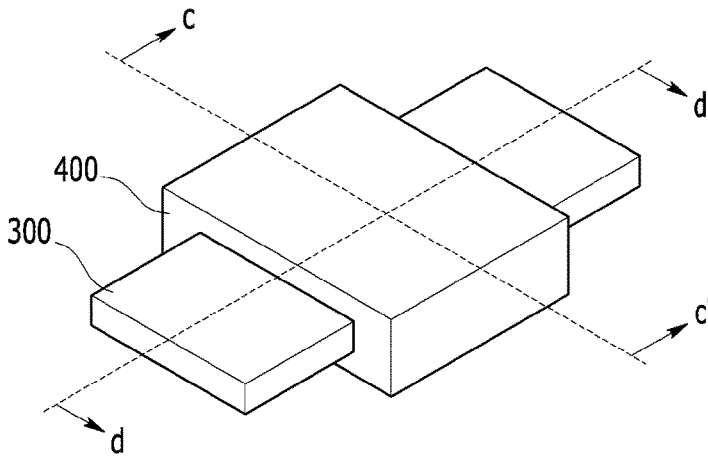
FIG. 4 is a perspective view showing an electrode lead included in the battery cell of FIG. 3.

FIG. 4 is a perspective view showing an electrode lead included in the battery cell of FIG. 3.

Referring to FIGS. 3 and 4, the electrode lead 300 is electrically connected to an electrode tab (not shown) included in the battery assembly 110, and protrudes out of the battery case 200 via the sealing portion 250. In addition, the lead film 400 is positioned at a portion corresponding to the sealing portion 250 in at least one of an upper portion and a lower portion of the electrode lead 300. Accordingly, the lead film 400 may improve the sealing properties of the sealing portion 250 and the electrode lead 300 while preventing a short circuit from occurring in the electrode lead 300 during thermal fusion.

In addition, the lead film 400 may have a greater width than the electrode lead 300. The lead film may have a greater length than the sealing portion and have a smaller length than the electrode lead. Accordingly, the lead film 400 may prevent the side surface of the electrode lead 300 from being exposed to the outside without interfering with the electrical connection of the electrode lead 300.

In addition, the lead film 400 may include a first lead film and a second lead film, the first lead film may be positioned at an upper portion of the electrode lead 300, and the second lead film may be positioned at a lower portion of the electrode lead 300. At this time, the electrode lead 300 may be heat-fused together with the sealing portion 250 in a state of being located between the first lead film and the second lead film, so that the first lead film and the second lead film may be connected to each other.

Accordingly, the lead film 400 may prevent the side surface of the electrode lead 300 from being exposed to the outside, while improving the sealing properties of the sealing portion 250 and the electrode lead 300.

Figure 5:
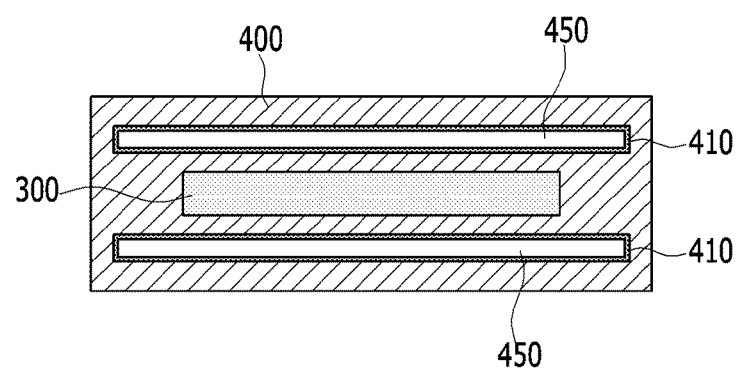
FIG. 5 is a cross-sectional view, taken along the axis c-c' of FIG. 4.
Figure 6:
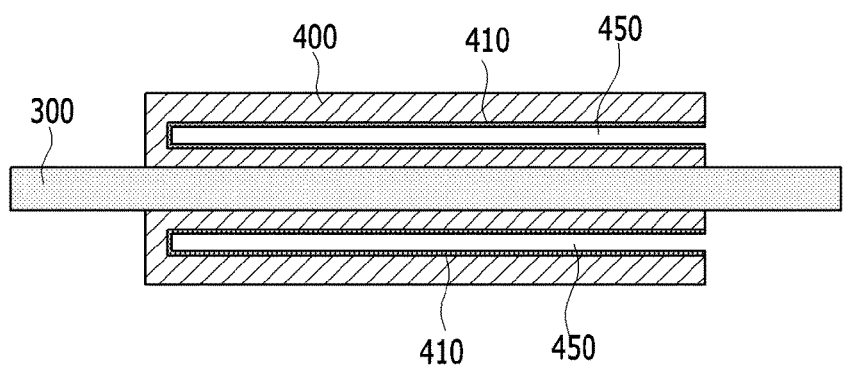
FIG. 6 is a cross-sectional view, taken along the axis d-d' of FIG. 4.
Figure 7:
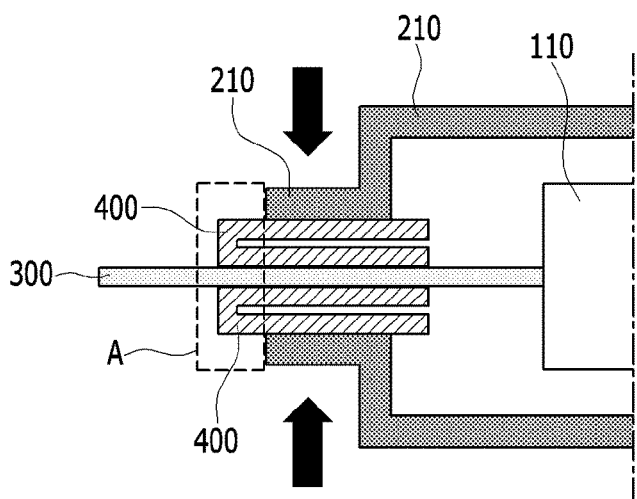
FIG. 7 is a cross-sectional view, taken along the axis b-b' of FIG. 3.

FIG. 5 is a cross-sectional view, taken along the axis c-c' of FIG. 4. FIG. 6 is a cross-sectional view, taken along the axis d-d' of FIG. 4. FIG. 7 is a cross-sectional view, taken along the axis b-b' of FIG. 3.

Referring to FIGS. 5 to 7, the lead film 400 includes a gas discharge portion 450 formed to extend from the inside of the battery case 200 to the outside of the battery case 200, and the gas discharge portion 450 is opened toward the inside of the battery case 200. In addition, a front surface (e.g., the surface disposed outside the battery case) and both side surfaces of the gas discharge portion 450 based on a protruding direction of the electrode lead 300 may be closed. Here, the gas discharge portion 450 may refer to a portion in which the remaining surfaces of the lead film 400 other than for the surface opened toward the inside of the battery case 200 are not adhered with each other. In addition, the gas discharge portion 450 may have a greater width than the electrode lead 300.

Accordingly, the gas generated inside the battery case 200 may flow in the gas discharge portion 450 of the lead film 400. In addition, when the pressure of the lead film 400 is higher than a predetermined pressure, the gas generated inside the battery case 200 may pass through the gas discharge portion 450 to be discharged to the outside. In addition, since a gas permeation area may be maximized by the gas discharge portion 450, the lead film 400 may discharge a large amount of gas.

In addition, the lead film 400 may further include an inner layer 410 that covers at least a part of the surface of the gas discharge portion 450. More preferably, the inner layer 410 may cover the entire surface of the gas discharge portion 450. Here, the inner layer 410 may be coated on the gas discharge portion 450 or may be manufactured as a separate film and attached to the gas discharge portion 450.

Accordingly, even if the lead film 400 is heat-fused together with the sealing portion 250 in a state of being located in at least one of the upper portion and the lower portion of the electrode lead 300, the gas discharge portion 450 may be preserved without being heat-fused by the inner layer 410.

More specifically, the inner layer 410 may be made of a material having a higher melting point compared to the material of the lead film 400. In addition, the inner layer 410 may be made of a material that does not react with an electrolytic solution contained in the battery case 300. For example, the lead film 400 may include a polyolefin-based material, and the inner layer 410 may include at least one of a polyolefin-based material, a fluorine-based material, and a porous ceramic-based material. In addition, the inner layer 410 may include a getter material to increase gas permeability while minimizing water permeability. As an example, the getter material may be calcium oxide (CaO), barium oxide (BaO), lithium chloride (LiCl), silica ($SiO_2$), or the like, but is not limited thereto, and any material reacting with water ($H_2O$) may be used.

Accordingly, since the inner layer 410 is made of the above-described material, the inner layer 410 does not react separately with the electrolytic solution and does not cause heat fusion, thermal deformation, or the like during the high-temperature thermal fusion process, so that the gas discharge portion 450 may be preserved or kept blank. That is, the inner surface of the gas discharge portion 450 may be maintained in a non-adhesive state. In addition, when the gas generated in the battery case 200 flows into the gas discharge portion 450, the inner surfaces of the gas discharge portion 450 may be spaced apart from each other, so that the gas introduced into the gas discharge portion 450 may be easily discharged to the outside. In addition, since the lead film 400 is made of the above-described material, the lead film 400 may maintain the airtightness of the battery cell 100 and also prevent leakage of the internal electrolytic solution.

Referring to FIG. 7, an end of the gas discharge portion 450 formed within the lead film 400 may be positioned further outward than (or outside of) the outer surface of the battery case 200. In addition, an end of the gas discharge portion 450 that is opened toward the inside of the battery case 200 may be positioned further inward than (or inside of) the inner surface of the battery case 200.

Accordingly, the lead film 400 may maximize the area of the gas discharge portion 450, thereby maximizing the area of the inner layer 410 to which the gas generated inside the battery case 200 is exposed. In addition, the permeation area of the gas generated inside the battery case 200 may be maximized, so that a large amount of gas may be discharged.

Figure 8:
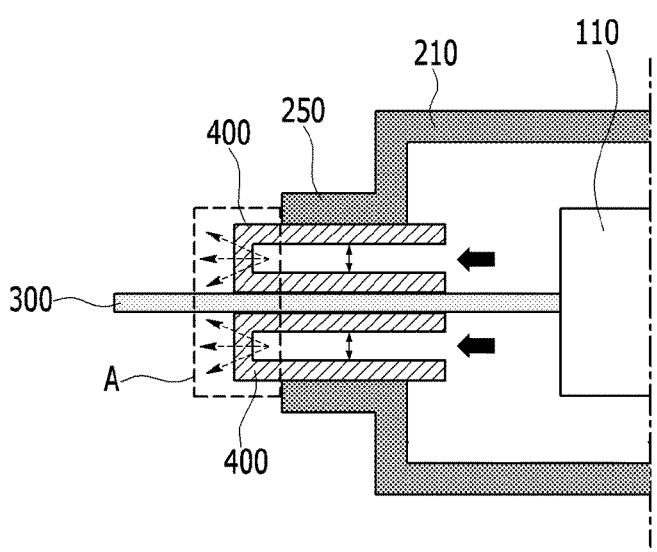
FIG. 8 is a diagram showing the flow of gas generated inside the battery cell of FIG. 7 and discharged to the outside.

FIG. 8 is a diagram showing the flow of gas generated inside the battery cell of FIG. 7 and discharged to the outside.

Referring to FIGS. 5 to 8, the gas generated inside the battery cell 100 of FIG. 7 may flow toward the gas discharge portion 450 of the lead film 400. At this time, the gas discharge portion 450 may be expanded upward and downward compared to FIG. 7 by the gas inside the battery cell 100. Also, as indicated by A in FIG. 8, when the gas inside the battery cell 100 exceeds a predetermined pressure, the gas inside the battery cell 100 may be discharged to the outside through the gas discharge portion 450.

Figure 2:
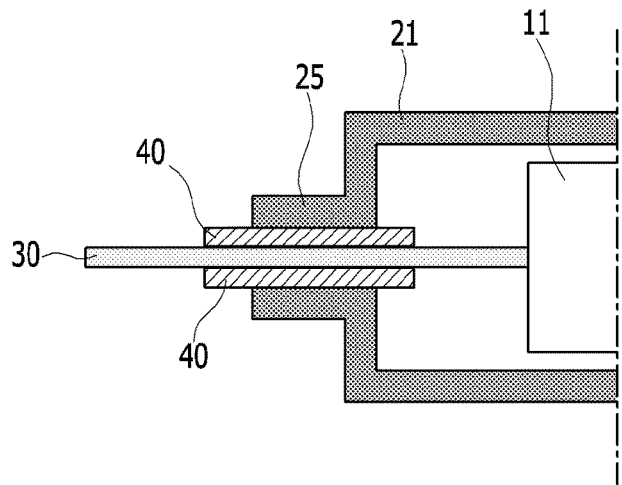
FIG. 2 is a cross-sectional view, taken along the axis a-a' of FIG. 1.

Accordingly, as compared with FIG. 2, as the gas discharge portion 450 is positioned on the lead film 400, the permeation area of the gas inside the battery cell 100 is also maximized, and thus the amount of the gas discharged to the outside may also be maximized.

A battery module according to another embodiment of the present disclosure includes the battery cell described above. Meanwhile, one or more battery modules according to this embodiment may be packaged in a pack case to form a battery pack.

The battery module described above and the battery pack including the same may be applied to various devices. These devices may be transportation means such as electric bicycles, electric vehicles, hybrid electric vehicles, and the like, but the present disclosure is not limited thereto, and the present disclosure may be applied various devices that can use a battery module and a battery pack including the same, which is also within the scope of the right of the present disclosure.

Hereinafter, the content of the present disclosure will be described through more specific examples, but the following examples are for illustratively describing the present disclosure, and the scope of the present disclosure is not limited thereto.

EXAMPLE

A battery cell including a battery case having an accommodation portion in which a battery assembly was mounted and a sealing portion formed by sealing an outer periphery of the battery case by heat fusion was manufactured. Here, an electrode tab included in the battery assembly was electrically connected to an electrode lead, and the electrode lead protruded out of the battery case via the sealing portion. At this time, a lead film was attached to a position corresponding to the sealing portion in an upper portion of the electrode lead, and a gas discharge portion extending from the inside of the battery case to the outside of the battery case was formed in the lead film.

Comparative Example

A battery cell was manufactured in the same manner as in the example, except that a separate gas discharge portion was not formed in the lead film.

Experimental Example 1—CT Scan Image

Figure 9:
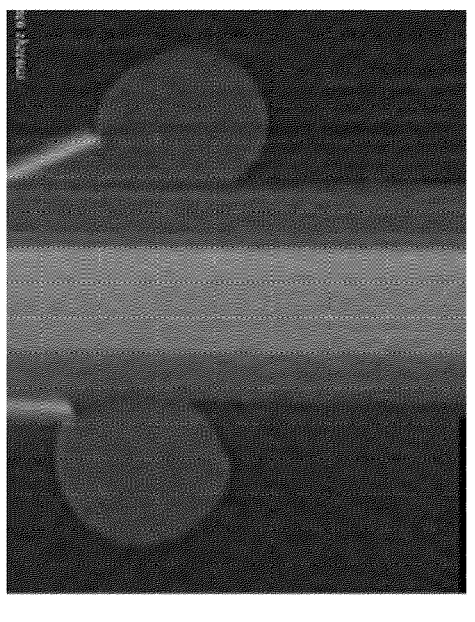
FIG. 9 is a diagram showing a cross section of a battery cell according to Experimental Example 1.
Figure 9:
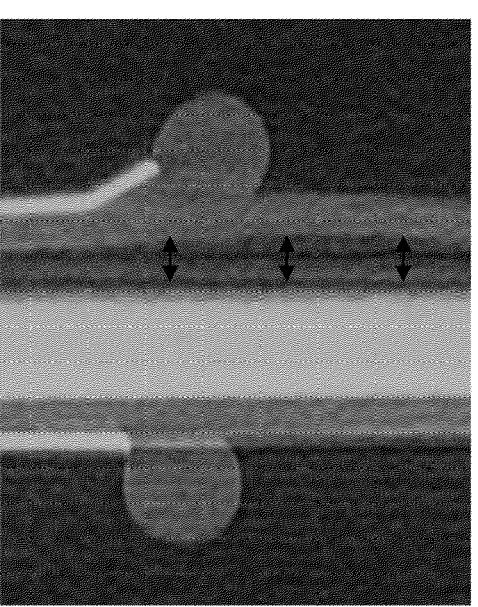

For the battery cell of the example, CT was taken centered on the sealing portion where the lead film and the electrode lead were located, and a CT image of the corresponding portion was obtained as shown in FIG. 9.

FIG. 9 is a diagram showing a cross section of a battery cell according to Experimental Example 1. In the battery cell of the example, FIG. 9(*a*) is a CT image of a cross-section of the lead film and electrode lead before the internal pressure of the battery cell of the example is increased, and FIG. 9(*b*) is a CT image of a cross-section of the lead film and electrode lead after the internal pressure of the battery cell of the example increases by injecting gas into the battery cell of the example.

Referring to FIG. 9(*a*), it is confirmed that, before the internal pressure of the battery cell of the example increases, there is no significant change centered on the gas discharge portion formed on the lead film. However, as the internal pressure of the battery cell of the example increases, it may be seen that the gas discharge portion formed in the lead film is spaced apart in the vertical direction (arrow direction), as shown in FIG. 9(*b*).

Accordingly, as in this example, if the gas discharge portion is formed in the lead film of the battery cell, the gas discharge portion is vertically spaced apart when the internal pressure of the battery cell increases, so that the gas inside the battery cell may be introduced into the gas discharge portion. That is, it may be seen that the gas discharge portion included in the battery cell of this example serves as a gas discharge path of the battery cell.

Experimental Example 2—Measurement of Gas Pressure in Battery Cell

Figure 10:
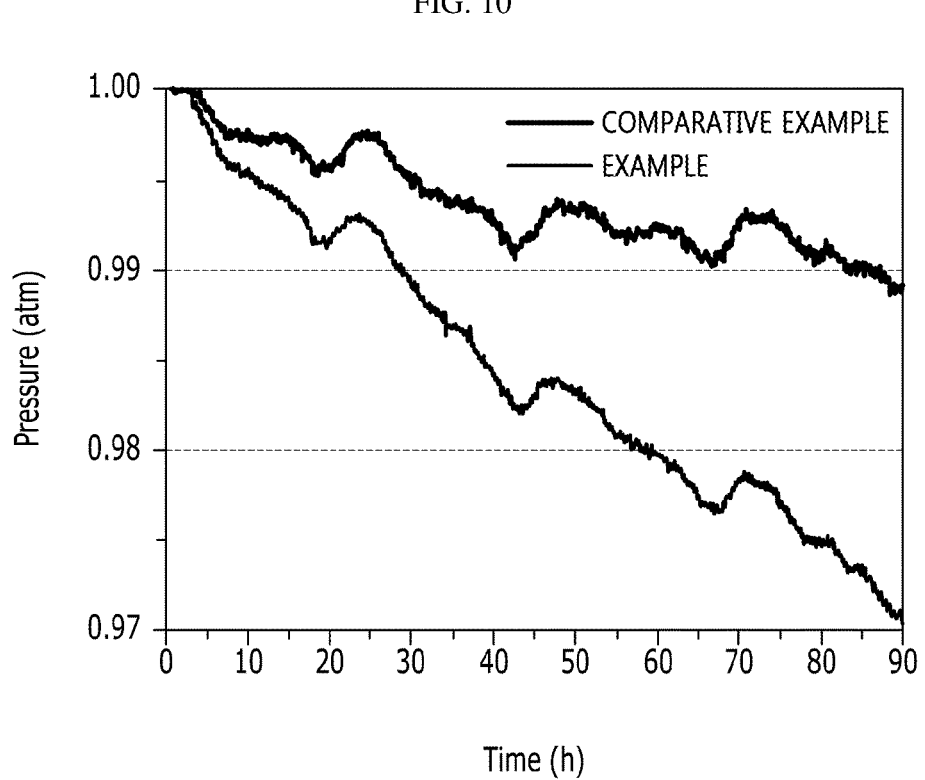
FIG. 10 is a diagram showing a measurement result of a gas pressure in a battery cell according to Experimental Example 2.

For the battery cells of the example and the comparative example, the gas pressure inside the battery cell over time was measured, and the results are shown in FIG. 10. In the battery cell of the example, the initial internal pressure of the battery cell was 1 atm.

FIG. 10 is a diagram showing a measurement result of a gas pressure in a battery cell according to Experimental Example 2.

Referring to FIG. 10, it may be confirmed that, in the battery cell according to the comparative example, the internal pressure decreases relatively little as time elapses in a state where the initial internal pressure is 1 atm. On the contrary, in the battery cell according to the example, it may be seen that the internal pressure is relatively significantly decreased as time elapses in a state where the initial internal pressure is 1 atm. That is, in the battery cell according to the example, it may be confirmed that the internal gas is effectively discharged to the outside through the gas discharge portion formed in the lead film over time.

Accordingly, in the battery cell according to the example, since the gas discharge portion is formed in the lead film, it may be confirmed that the gas is easily discharged to the outside through the gas discharge portion when the pressure inside the battery cell increases.

Although the preferred embodiment of the present disclosure has been described in detail above, the scope of the right of the present disclosure is not limited thereto, and various modifications and improvements made by those skilled in the art using the basic concept of the present disclosure defined in the appended claims also fall within the scope of the right of the present disclosure.

REFERENCE SIGNS

100: battery cell
110: battery assembly
200: battery case
210: accommodation portion
250: sealing portion
300: electrode lead
400: lead film
410: inner layer
450: gas discharge portion

What is claimed is:

1. A battery cell, comprising:
a battery case having an accommodation portion in which a battery assembly is positioned, and a sealing portion formed by sealing an outer periphery thereof by heat fusion;
an electrode lead electrically connected to an electrode tab included in the battery assembly, the electrode lead protruding out of the battery case through the sealing portion; and
a lead film positioned adjacent to the sealing portion on at least one of a first side and a second side of the electrode lead,
wherein the lead film includes a gas discharge portion formed to extend from an inside of the battery case to an outside of the battery case,
wherein the gas discharge portion is opened on a side disposed inside of the battery case, and
wherein a first end surface of the gas discharge portion is closed and discharges gas therethrough to an outside of the battery cell while closed.

2. The battery cell according to claim 1,
wherein opposing side surfaces of the lead film forming the gas discharge portion are closed and configured to discharge gas therethrough to the outside of the battery cell while closed.

3. The battery cell according to claim 2, further comprising:
an inner layer configured to cover at least a part of a surface of the gas discharge portion.

4. The battery cell according to claim 3,
wherein a material of the inner layer has a higher melting point compared to a material of the lead film, and the material of the inner layer does not react with an electrolytic solution.

5. The battery cell according to claim 4,
wherein the lead film contains a polyolefin-based material, and
the inner layer contains at least one of polyolefin-based, fluorine-based and porous ceramic-based materials.

6. The battery cell according to claim 2, wherein the first end surface and the opposing side surfaces are disposed on the outside of the battery case.

7. The battery cell according to claim 1, wherein the lead film has a greater width than the electrode lead.

8. The battery cell according to claim 7, wherein the lead film has a greater length than the sealing portion, and the lead film has a smaller length than the electrode lead.

9. The battery cell according to claim 7, wherein the gas discharge portion has a greater width than the electrode lead.

10. The battery cell according to claim 1, wherein the lead film includes a first lead film and a second lead film, the first lead film is positioned on a first side of the electrode lead, and the second lead film is positioned on a second side of the electrode lead.

11. The battery cell according to claim 10, wherein the electrode lead is positioned between the first lead film and the second lead film, and the first lead film and the second lead film are connected to each other.

12. The battery cell according to claim 1, wherein an end of the gas discharge portion formed within the lead film is positioned further outward than an outer surface of the battery case.

13. The battery cell according to claim 12, wherein an end of the gas discharge portion opened toward the inside of the battery case is positioned further inward than an inner surface of the battery case.

14. A battery module, comprising the battery cell according to claim 1.

15. The battery cell according to claim 1, wherein the lead film is configured to permit the gas to permeate therethrough to expel the gas from the gas discharge portion to the outside of the battery cell.

\* \* \* \* \*